United States Patent [19]
Like

[11] 4,071,333
[45] Jan. 31, 1978

[54] ABRASIVE SCOURING BLOCK (AND SUPPORT THEREFOR)

[75] Inventor: Burton M. Like, East Brunswick, N.J.

[73] Assignee: American Cyanamid Company, Stamford, Conn.

[21] Appl. No.: 733,647

[22] Filed: Oct. 18, 1976

[51] Int. Cl.[2] .................... C09K 3/14
[52] U.S. Cl. .................... 51/304; 51/308; 106/3
[58] Field of Search .................... 51/308, 303, 304, 305, 51/306, 309; 106/3

[56] References Cited

U.S. PATENT DOCUMENTS

| | | | |
|---|---|---|---|
| 2,829,035 | 4/1958 | Doughty et al. | 51/304 |
| 3,171,724 | 3/1965 | Nichols | 51/308 |
| 3,458,300 | 7/1969 | Duvall et al. | 51/308 |

*Primary Examiner*—Donald J. Arnold
*Attorney, Agent, or Firm*—Charles J. Fickey

[57] ABSTRACT

Hard surface scouring or cleansing composition, more particularly a scouring block comprising a non-ionic detergent, a long-chain fatty alcohol and an abrasive material.

10 Claims, No Drawings

ABRASIVE SCOURING BLOCK (AND SUPPORT THEREFOR)

This invention relates to hard surface scouring or cleansing compositions, and more particularly to a scouring block comprising a detergent and an abrasive material.

Hard surface scouring powders are widely known and used. They usually comprise a soap or detergent and an abrasive, and may also contain a disinfecting or bleaching agent. These scouring powders are not without disadvantages, however, in that they are dusty, don't readily cling to vertical surfaces, cake under humid conditions, and the like.

The present invention provides a supported or unsupported block, comprising essentially a high melting, non-ionic detergent, an abrasive material, optionally a long-chain fatty alcohol and a sodium alkyl sulfate.

Non-ionic, high melting detergents are used as an essential ingredient in the scouring block composition since they are hard, waxy solids at normal room temperatures. They function as a friable binder material which wears away with use and also provides cleansing action. A preferred non-ionic detergent type is the polyethoxylated alkyl phenols, for example nonylphenoxy(ethyleneoxy)ethanol, in which about 20 - 40 moles of ethylene oxide are condensed with nonylphenol:

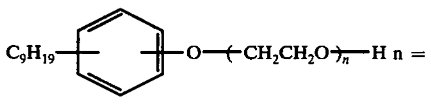 n = 20 - 40

Ethoxylated straight chain alcohols may also be used as the high melting, non-ionic material, alone or combined with the ethoxylated alkyl phenol. Suitable long, straight chain alcohols are those containing at least 12 carbon atoms, condensed with from 20 to 40 moles of ethylene oxide. Preferred long, straight chain alcohols are those containing 16 - 18 carbon atoms; a suitable ethoxylated straight chain alcohol is exemplified by Alfonic 1618-65, which is a mixture of $C_{16}$ and $C_{18}$ alcohols containing about 65% ethylene oxide.

Abrasive materials useful in the scouring block composition include fine silica, calcium carbonate, kaolin, calcium phosphate, diatomaceous earth, pumice, corundum, and the like. The preferred abrasive material is fine silica (sand) since it is very effective, readily available, and inexpensive.

Optionally, but preferably, the scouring composition additionally contains a long chain ($C_{16}$ - $C_{20}$) fatty alcohol, such as stearyl alcohol, cetyl alcohol, and the like, and an alkali metal alkyl ($C_{12}$ - $C_{14}$) sulfate, such as sodium lauryl sulfate.

The long chain fatty alcohol provides some lubrication to the composition, but more importantly provides the scouring block with improved resistance to dissolution in water. The long chain fatty alcohols are water insoluble and thereby help to prevent the scouring block from becoming soft and gelatinous when standing in contact with water.

The alkali metal alkyl sulfate provides foaming action, and is also an anionic detergent.

The scouring block compositions may contain from about 65 - 85 percent abrasive material, from about 10 - 20 percent non-ionic detergent, from about 5 - 15 percent long chain fatty alcohol and up to about 10 percent alkali metal alkyl sulfate. Preferably, they will contain from about 70 - 75 percent abrasive, from about 15 - 20 percent non-ionic detergent, from about 10 - 20 percent long chain fatty alcohol and up to about 5 percent alkali metal alkyl sulfate. Still more preferably, they will contain from about 72 - 74 percent abrasive, from about 10 - 20 percent non-ionic detergent, from about 5 - 15 percent long chain fatty alcohol and from about 1 - 3 percent alkali metal alkyl sulfate.

The composition may be unsupported or supported. In an unsupported application, a block, much like a bar of soap, is formed in a suitable mold by mixing the ingredients and pouring them into the mold. In a supported application, a wide variety of fixed or replaceable supports may be envisioned. One such support resembles a conventional fingernail brush with the bristles replaced by the scouring block molded in place. A large number of similar supports are possible. A supported scouring block has the advantage that it enables the user to be physically out of contact therewith during use. In either supported or unsupported forms the block may be molded into a variety of shapes having flat, convex or concave surfaces to fit a particular use application, for instance a rounded sink surface, or a toilet bowl.

In addition to the essential and optional ingredients the scouring block composition may contain minor amounts of other desirable ingredients, such as dyes and pigments, perfumes, bacteriostatic and bacteriocidal agents, bleaching agents, and the like.

The following compositions further illustrate the invention.

EXAMPLE 1

| Scouring Block | Parts by Weight |
|---|---|
| Sand (200 mesh) | 73.8 |
| Igepal CO-890[(1)]* | 10.0 |
| Stearyl alcohol | 15.0 |
| Sodium lauryl sulfate | 1.0 |
| Green pigment | 0.2 |
| | 100.0 |

*Nonylphenoxy (ethyleneoxy)ethanol: nonylphenol condensed with 40 moles of ethylene oxide The Igepal CO-890 and stearyl alcohol are melted at 90° C. The sand, sodium lauryl sulfate and pigment are blended and then added to the molten mixture. The entire mixture is then poured into an aluminum weighing dish and allowed to cool. When cool the composition is removed from the aluminum dish.

EXAMPLE 2

| Supported Scouring Block | Parts by Weight |
|---|---|
| Sand (200 mesh) | 71.9 |
| Igepal CO-890 | 15.0 |
| Stearyl alcohol | 10.0 |
| Sodium lauryl sulfate | 3.0 |
| Green pigment | 0.1 |
| | 100.0 |

The bristles were removed from a conventional fingernail brush and a mold formed around the edge thereof using masking tape. Following the procedure of Example 1, the above formulation was prepared and poured into the mold at 90° C, resulting in a scouring block molded into a fingernail brush support.

EXAMPLE 3

A supported scouring block is obtained following the procedure of Example 2 whereby Igepal CO-890 is replaced with an equal amount of Alfonic 1618-65. Good scouring properties are obtained.

EXAMPLE 4

A scouring block is prepared in accordance withthe the procedure of Example 1 using the following ingredients:

| | Parts by Weight |
|---|---|
| Sand (200 mesh) | 72.9 |
| Igepal CO-890 | 15.0 |
| Cetyl alcohol | 10.0 |
| Sodium lauryl sulfate | 2.0 |
| Green pigment | 0.1 |
| | 100.0 |

EXAMPLE 5

Following the procedure of Example 2 a supported scouring block is prepared using the following composition:

| | Parts by Weight |
|---|---|
| Sand (200 mesh) | 71.9 |
| Igepal CO-890 | 10.0 |
| Alfonic 1618-65 | 5.0 |
| Cetyl alcohol | 3.0 |
| Stearyl alcohol | 10.0 |
| Green pigment | 0.1 |
| | 100.0 |

I claim:

1. A hard surface scouring block composition consisting essentially of from about 65 - 85 percent by weight of an abrasive material, from about 10 - 20 percent by weight of a high melting, non-ionic detergent, from about 5 - 15 percent by weight of a long chain fatty alcohol and up to about 10 percent by weight of an alkali metal alkyl sulfate.

2. A composition in accordance with claim 1 wherein said high melting, non-ionic detergent is selected from polyethoxylated alkyl phenols and polyethoxylated, straight chain fatty alcohols containing from about 20 to 40 moles of ethylene oxide condensed therewith.

3. A composition in accordance with claim 2 wherein said polyethoxylated alkyl phenol is a nonylphenoxy(ethyleneoxy)ethanol represented by the formula:

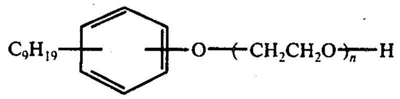

wherein *n* is an integer from 20 to 40.

4. A composition in accordance with claim 1 wherein said abrasive material is selected from the group consisting of sand, calcium carbonate, kaolin, calcium phosphate, diatomaceous earth, pumice and corundum.

5. A composition in accordance with claim 4 wherein said abrasive is fine sand.

6. A scouring block composition comprising from about 70 - 75 percent by weight of sand, from about 15 - 20 percent by weight of a solid, high melting non-ionic detergent selected from polyethoxylated alkylphenols and polyethoxylated straight chain fatty alcohols, from about 10 - 20 percent by weight of a long chain fatty alcohol, and up to about 5 percent by weight of an alkali metal alkyl sulfate.

7. A scouring block composition according to claim 6 comprising 72 - 74 percent by weight of fine sand, from about 10 - 20 percent by weight of polyethoxylated alkyl phenol represented by the formula:

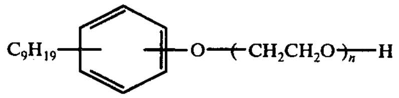

wherein *n* is an integer from 20 to 40, from about 5 15 percent by weight of a $C_{16}$ - $C_{18}$ fatty alcohol and from about 1 to 3 percent by weight of a sodium alkyl ($C_{12}$ - $C_{14}$) sulfate.

8. A device for scouring hard surfaces consisting essentially of a suitable support adapted to be hand held and affixed to a molded scouring block having a composition according to claim 1.

9. A device according to claim 8 wherein said scouring block is bonded to said support.

10. A device according to claim 8 wherein said scouring block is removably attached to said support.

* * * * *